United States Patent [19]

Uchida et al.

[11] Patent Number: 4,585,824

[45] Date of Patent: Apr. 29, 1986

[54] GLASS FIBER-REINFORCED HEAT RESISTANT RESIN COMPOSITION

[75] Inventors: Minoru Uchida, Yokkaichi; Sadao Ikuma, Suzuka, both of Japan

[73] Assignee: Mitsubishi Monsanto Chemical Company, Tokyo, Japan

[21] Appl. No.: 658,050

[22] Filed: Oct. 5, 1984

[51] Int. Cl.$^4$ .......................... C08K 3/40; C08K 7/14; C08J 5/08

[52] U.S. Cl. .................................. 524/494; 524/504; 524/516; 524/517; 524/521

[58] Field of Search ............... 524/516, 517, 521, 494, 524/504

[56] References Cited

FOREIGN PATENT DOCUMENTS

| | | | |
|---|---|---|---|
| 1250117 | 9/1967 | Fed. Rep. of Germany | 524/494 |
| 0036269 | 3/1980 | Japan | 524/494 |
| 1365329 | 8/1977 | United Kingdom . | |
| 1583465 | 1/1981 | United Kingdom . | |
| 2122625 | 1/1984 | United Kingdom . | |

OTHER PUBLICATIONS

Derwent Abs. 39136 D/22 (J56038343) 1981 Mitsubishi Mont.
Derwent Abs. 69343 E/33 (J57111305) 1982 Mitsubishi Mont.
C.A. 89-216419d) Igarashi 1978 "Plast Age" 24(5)79–82.

*Primary Examiner*—Herbert J. Lilling
*Attorney, Agent, or Firm*—Oblon, Fisher, Spivak, McClelland & Maier

[57] ABSTRACT

A glass fiber-reinforced heat resistant resin composition which comprises:

from 5 to 90% by weight of a pelletized polymer (A) obtained by suspension-polymerizing a vinyl aromatic monomer optionally together with an unsaturated nitrile monomer and a vinyl monomer copolymerizable therewith, in the presence of chopped glass fiber strands, and comprising from 50 to 90% by weight of the chopped glass fiber strands and from 50 to 10% by weight of a resin component consisting essentially of from 40 to 100% of residues of the vinyl aromatic monomer, from 0 to 60% of residues of the unsaturated nitrile monomer and from 0 to 30% of residues of the copolymerizable vinyl monomer;

from 95 to 10% by weight of a polymer (B) comprising from 10 to 50% of residues of a maleimide monomer, from 90 to 50% of residues of a vinyl aromatic monomer, from 0 to 10% of residues of maleic anhydride and from 0 to 30% of residues of a vinyl monomer copolymerizable therewith.

12 Claims, No Drawings

GLASS FIBER-REINFORCED HEAT RESISTANT RESIN COMPOSITION

The present invention relates to a glass fiber-reinforced heat resistant resin composition having excellent thermal stability and heat resistance.

Glass fiber-reinforced thermoplastic resins are widely used for e.g. casings for electric and electronic appliances since they have high mechanical strength and excellent dimensional stability and moldability.

However, the thermoplastic resins used as the matrix for these resins are usually polystyrenes or styreneacrylonitrile copolymers (AS resins) which have relatively low heat resistance (i.e. relatively low heat deformation resistance). Therefore, they are not useful in the field where high heat resistance is required. It is known to copolymerize maleic anhydride in order to improve the heat resistance, but such a copolymer is not practical since it undergoes decomposition at a high temperature.

Further, there has been a disadvantage that when a thermoplastic resin is mixed with glass fibers, the extruder is likely to be weared off or to be clogged.

The present inventors have conducted extensive researches with an aim to solve such problems and to develop a glass fiber-reinforced thermoplastic resin having excellent heat resistance and high temperature stability. As a result, the present invention has been accomplished.

Namely, present invention provides a glass fiber-reinforced heat resistant resin composition which comprises:

from 5 to 90% by weight of a pelletized polymer (A) obtained by suspension-polymerizing a vinyl aromatic monomer optionally together with an unsaturated nitrile monomer and a vinyl, monomer copolymerizable therewith, in the presence of chopped glass fiber strands, and comprising from 50 to 90% by weight of the chopped glass fiber strands and from 50 to 10% by weight of a resin component consisting essentially of from 40 to 100% of residues of the vinyl aromatic monomer, from 0 to 60% of residues of the unsaturated nitrile monomer and from 0 to 30% of residues of the copolymerizable vinyl monomer;

from 95 to 10% by weight of a polymer (B) comprising from 10 to 50% of residues of a maleimide monomer, from 90 to 50% of residues of a vinyl aromatic monomer, from 0 to 10% of residues of maleic anhydride and from 0 to 30% of residues of a vinyl monomer copolymerizable therewith;

from 0 to 50% by weight of a polymer (C) comprising from 40 to 100% of residues of a vinyl aromatic monomer, from 0 to 60% of residues of an unsaturated nitrile monomer and from 0 to 30% of residues of a vinyl monomer copolymerizable therewith; and from 0 to 50% by weight of a copolymer (D) obtained by graft-copolymerizing a vinyl aromatic monomer optionally together with an unsaturated nitrile monomer and a vinyl monomer copolymerizable therewith, to a rubber, and comprising from 5 to 70% by weight of the rubber and from 30 to 95% by weight of a resin component consisting essentially of from 40 to 100% of residues of the vinyl aromatic monomer, from 0 to 60% of residues of the unsaturated nitrile monomer and from 0 to 30% of residues of the copolymerizable vinyl monomer.

Now, the present invention will be described in detail with reference to the preferred embodiments.

As the vinyl aromatic monomer used in the present invention, styrene is most common, but α-methylstyrene, p-methylstyrene, ter-butylstyrene, a halogenated styrene or a mixture thereof may also be employed.

As the unsaturated nitrile monomer, there may be employed acrylonitrile, methacrylonitrile or a mixture thereof.

As the copolymerizable vinyl monomer, there may be mentioned an acrylate or a methacrylate.

The pelletized polymer (A) containing glass fibers is preferably produced in accordance with the method disclosed in Japanese Examined Patent Publication No. 4110/1978, by suspending, in water, chopped strands prepared by bundling from 10 to 1000 glass fibers having a length of from 1 to 10 mm and a diameter of at most 20 μm, and preferably surface-treated with a silane derivative such as an acrylic silane compound, together with a predetermined amount of the vinyl aromatic monomer and, if required, the unsaturated nitrile monomer and the copolymerizable vinyl monomer, and polymerizing them. By this method, the bundled glass fibers are coated with the copolymer to form a pelletized polymer. The proportion of the chopped glass fiber strands in the copolymer (A) is from 50 to 90% by weight, the rest being the resin component. If the proportion of the glass fibers is less than 50% by weight, the mechanical strength, the dimensional stability, etc. will be inadequate. On the other hand, if the proportion exceeds 90% by weight, the mixing with other resins will be difficult. The resin component of the polymer (A) consists essentially of from 40 to 100% of residues of the vinyl aromatic monomer (the percentage is a ratio of the number of the monomer residues relative to the total number of the entire residues; the same applies hereinafter), from 0 to 60% of residues of the unsaturated nitrile monomer and from 0 to 30% of the copolymerizable vinyl monomer. If the residues of the unsaturated nitrile monomer and the copolymerizable vinyl monomer exceed the above ranges, the compatibility with other polymers will be deteriorated.

The proportion of the polymer (A) in the composition of the present invention is from 5 to 90% by weight (the total amount of the composition is taken as 100% by weight; the same applies hereinafter). If the proportion of the polymer (A) is less than 5% by weight, the mechanical properties will be inadequate. On the other hand, if the proportion exceeds 90% by weight, the heat resistance and the moldability tend to be deteriorated.

The polymer (B) comprises from 10 to 50% of residues of a maleimide monomer, from 90 to 50% of residues of a vinyl aromatic monomer, from 0 to 10% of residues of maleic anhydride, and from 0 to 30% of residues of the copolymerizable vinyl monomer. If the maleimide residues are less than 10%, the heat resistance will be poor. On the other hand, if the maleimide residues exceed 50%, the moldability and the compatibility with other resins tend to be poor. If the residues of maleic anhydride exceed 10%, the thermal stability will be deteriorated.

As the maleimide monomer, there may be employed maleimide, an N-aromatic maleimide such as N-phenylmeleimide, or a mixture thereof.

The polymer (B) may be prepared by polymerizing the above-mentioned monomers, or it may be prepared by reacting ammonia, aniline or other primary amine to a polymer containing maleic anhydride residues in an amount corresponding to the content of the residues of the maleimide monomer to convert it into an imide.

The proportion of the polymer (B) in the composition of the present invention is usually from 95 to 10% by weight.

The copolymer (C) comprises from 40 to 100% of residues of a vinyl aromatic monomer, from 0 to 60% of residues of an unsaturated nitrile monomer, and from 0 to 30% of residues of a vinyl monomer copolymerizable therewith. As the content of the unsaturated nitrile monomer residues increases, the chemical resistance will be improved, but the compatibility with other resins tends to be poor. For this reason, the above-mentioned ranges are proper. The proportion of the polymer (C) in the composition of the present invention is usually from 0 to 50% by weight. If the content exceeds 50% by weight, the heat resistance tends to decrease, such being undesirable.

The polymer (D) is a copolymer obtained by graft-copolymerizing from 30 to 95% by weight of the total amounts of the monomers, i.e. a vinyl aromatic monomer, and optionally an unsaturated nitrile monomer and a vinyl monomer copolymerizable therewith, to from 5 to 70% by weight of a rubber.

The matrix resin component of the polymer (D) comprises from 40 to 100% of residues of the vinyl aromatic monomer, from 0 to 30% of residues of the unsaturated nitrile monomer, and from 0 to 30% of residues of the copolymerizable vinyl monomer. As the contents of the unsaturated nitrile monomer residues and the copolymerizable vinyl monomer residues increase, the chemical resistance and moldability will be improved, but the compatibility with other resins tends to be poor. For this reasons, the above-mentioned ranges are proper.

The proportion of the polymer (D) in the composition of the present invention is usually from 0 to 50% by weight. If the content exceeds 50% by weight, the heat resistance of the composition of the present invention tends to decrease, such being undesirable.

The composition of the present invention may consist of the polymers (A) and (B) only. However, if the polymer (C) and/or the polymer (D) is incorporated into such a composition of the present invention, the chemical resistance, moldability and impact strength will be improved.

The composition of the present invention has particularly good heat resistance and thermal stability, and also has excellent dimensional stability, mechanical strength and corrosion resistance. Thus, the industrial value is substantial.

Now, the present invention will be described in detail with reference to Examples and Comparative Examples. However, it should be understood that the present invention is by no means restricted by these specific Examples.

EXAMPLES 1 to 4 and COMPARATIVE EXAMPLES 1 to 4

As the polymer (A), Collimate ® M800 (Sample 1) manufactured by Mitsubishi Monsanto Chemical Company, was used. Collimate M800 is composed of 80% by weight of glass fibers and 20% by weight of a polymer consisting essentially of 37% of the residues of acrylonitrile and 65% of residues of styrene.

The polymers (B) and (C) were prepared in the following manners.

Into a 300 liter kettle, 69 kg of styrene and 2 kg of maleic anhydride were charged, and the temperature was raised to 95° C. While maintaining the temperature at this level, 10 kg of maleic anhydride was continuously charged at a constant rate over a period of 7 hours and 30 minutes. After the completion of the charging of the maleic anhydride, 23 kg of acrylonitrile was added. Then, 90 kg of water containing a suspending agent was added thereto, and the temperature was raised to 120° C. While copolymerizing styrene and acrylonitrile at this temperature for 5 hours, unreacted monomers were removed from the system by stripping. Then, 9 kg (25% by weight) of aniline and 2.5 kg of aqueous ammonia were fed into this system, and the mixture was maintained at 150° C. for 2.5 hours, and then cooled. The resulting beads were removed from the aqueous suspension, dried and then pelletized by an extruder. The pellets thereby obtained were analyzed, and were found to be a blend polymer comprising 70% by weight of a maleimide monomer-containing polymer (B) consisting essentially of 23% of residues of N-phenylmaleimide, 8% of residues of maleimide and 69% of residues of styrene; and 30% by weight of a polymer (C) consisting essentially of 35% of residues of acrylonitrile and 65% of residues of styrene. This blend polymer is designated as Sample 2.

As the polymer (C), an AS resin (SAN-C, manufactured by Mitsubishi Monsanto Chemical Company) comprising 60% of residues of styrene and 40% of residues of acrylonitrile, was used. This AS resin is designated as Sample 3.

As the polymer (D), a graft-copolymer comprising 22% by weight of polybutadiene rubber, and 78% by weight of an AS resin consisting essentially of 60% of residues of styrene and 40% of residues of acrylonitrile, was used. This graft-copolymer is designated as Sample 4.

Further, as a styrene-maleic anhydride copolymer, there was used, a mixture comprising 67% by weight of a copolymer consisting essentially of 31% of residues of maleic anhydride and 69% of residues of styrene, and 33% by weight of an AS resin consisting essentially of 65% of residues of styrene and 35% of residues of acrylonitrile. This mixture is designated as Sample 5.

The above Samples were mixed in the proportions as identified in the column for "Proportions" in Table 1, and test pieces were prepared from the mixtures by means of a 7 ounce molding machine. Then, the physical properties of the test pieces were measured in accordance with the following methods. The results of the measurements are shown in Table 1.

Tensile strength, Izod impact strength, and heat deformation temperature: JIS K 6871

Bending strength, and bending modulus: ASTM D 790

Gear oven test: Test pieces were kept in a gear oven at 270° C. for 1 hour, and the foaming and the weight reduction were measured.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Proportions | | | | | | | | |
| Sample 1 | 19 | 25 | 19 | 25 | 25 | 19 | 19 | |

TABLE 1-continued

| | | Examples | | | | Comparative Examples | | | |
|---|---|---|---|---|---|---|---|---|---|
| | | 1 | 2 | 3 | 4 | 1 | 2 | 3 | 4 |
| Sample 2 (corresponds to the polymer (B)) | | 57 | 53 | 37 | 34 | | | | 70 |
| Sample 2 (corresponds to the polymer (C)) | | 24 | 22 | 16 | 15 | | | 27 | 30 |
| Sample 3 | | | | | | 75 | 53 | | |
| Sample 4 | | | | 28 | 26 | | 28 | | |
| Sample 5 | | | | | | | | 54 | |
| Content of glass fibers (% by weight) | | 15 | 20 | 15 | 20 | 20 | 15 | 15 | 0 |
| Physical properties | | | | | | | | | |
| Tensile strength (kg/cm²) | | 900 | 1,100 | 950 | 1,100 | 1,250 | 860 | 900 | 600 |
| Bending strength (kg/cm²) | 23° C. | 1,000 | 1,200 | 1,100 | 1,300 | 1,600 | 1,060 | 1,000 | 720 |
| | 80° C. | 900 | 1,000 | 900 | 1,050 | 1,000 | 670 | 900 | 580 |
| Bending modulus (kg/cm²) | 23° C. | 70,000 | 80,000 | 58,000 | 68,000 | 75,000 | 50,000 | 70,000 | 37,000 |
| | 80° C. | 60,000 | 65,000 | 47,000 | 55,000 | 57,000 | 44,000 | 60,000 | 29,000 |
| Izod impact strength (kg cm/cm) | | 7.0 | 8.0 | 7.5 | 7.5 | 10.0 | 8.5 | 7.5 | 1.2 |
| Heat deformation temperature (°C.) | | 143 | 142 | 126 | 127 | 104 | 100 | 140 | 135 |
| Gear oven test | Foaming | Not observed | Not observed | Not observed | Not observed | Not observed | Not observed | Observed | Not observed |
| | Weight reduction (%) | 0.8 | 0.7 | 0.8 | 0.7 | 0.7 | 0.8 | 3.5 | 0.9 |

We claim:

1. A glass fiber-reinforced heat resistant resin composition which comprises:

from 5-90% by weight of a pelletized polymer (A) obtained by suspension-polymerizing a vinyl aromatic monomer, in the presence of chopped glass fiber strands, and comprising from 50 to 90% by weight of the chopped glass fiber strands and from 50 to 10% by weight of a resin component consisting essentially of from 40 to 100% of residues of the vinyl aromatic monomer;

from 95 to 10% by weight of a polymer (B) comprising from 10 to 50% of residues of a maleimide monomer, and from 90 to 50% of residues of a vinyl aromatic monomer;

from 15 to 50% by weight of a polymer (C) comprising from 40 to 100% of residues of a vinyl aromatic monomer; and from 0 to 50% by weight of a copolymer (D) obtained by graft-copolymerizing a vinyl aromatic monomer, to a rubber, and comprising from 5 to 70% by weight of the rubber and from 30 to 95% by weight of a resin component consisting essentially of from 40 to 100% of residues of the vinyl aromatic monomer.

2. The composition according to claim 1, wherein the vinyl aromatic monomer is styrene, α-methylstyrene, p-methylstyrene, ter-butylstyrene, a halogenated styrene or a mixture thereof.

3. The composition according to claim 1, wherein the unsaturated nitrile monomer is acrylonitrile, methacrylonitrile or a mixture thereof.

4. The composition according to claim 1, wherein the copolymerizable vinyl monomer is an acrylate or a methacrylate.

5. The composition according to claim 1, wherein the maleimide monomer is maleimide, an N-aromatic maleimide or a mixture thereof.

6. The composition according to claim 1, wherein the resin component of said pelletized polymer (A) is obtained via suspension polymerization of, in addition to the vinyl aromatic monomer, an unsaturated nitrile monomer and a vinyl monomer copolymerizable therewith.

7. The composition according to claim 6, wherein said resin component further contains up to 60% of residues of the unsaturated nitrile monomer and up to 30% of the residues of the copolymerizable vinyl monomer.

8. The composition according to claim 1, wherein polymer (B) further comprises up to 10% of residues of maleic anhydride and up to 30% of residues of a vinyl monomer copolymerizable therewith.

9. The composition according to claim 1, wherein polymer (C) further comprises up to 60% of residues of an unsaturated nitrile monomer and up to 30% of residues of a vinyl monomer copolymerizable therewith.

10. The composition according to claim 1, wherein copolymer (D) is obtained by graft-copolymerizing, in addition to the vinyl aromatic monomer, an unsaturated nitrile monomer and a vinyl monomer copolymerizable therewith, to a rubber.

11. The composition according to claim 10, wherein the resin component of said copolymer (D) comprises up to 60% of residues of the unsaturated nitrile monomer and up to 30% of the residues of the copolymerizable vinyl monomer.

12. The composition according to claim 1, wherein said rubber of copolymer (D) is a polybutadiene rubber.

* * * * *